(No Model.)
W. H. HOWES.
Method of Ornamenting the Surface of Jewelry, &c.
No. 242,649.  Patented June 7, 1881.
Fig: 1.
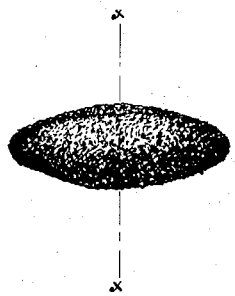
Fig: 2.
WITNESSES:
Chas. Nida
C. Sedgwick
INVENTOR:
W. H. Howes
BY Munn &Co
ATTORNEYS

UNITED STATES PATENT OFFICE.

WILLIS H. HOWES, OF NEW YORK, N. Y., ASSIGNOR TO HALE & MULFORD, OF SAME PLACE.

METHOD OF ORNAMENTING THE SURFACE OF JEWELRY, &c.

SPECIFICATION forming part of Letters Patent No. 242,649, dated June 7, 1881.

Application filed April 14, 1881. (No model.)

*To all whom it may concern:*

Be it known that I, WILLIS H. HOWES, of the city, county, and State of New York, have invented a new and useful Improvement in Ornamenting the Surface of Jewelry and other Articles, of which the following is a full, clear, and exact description.

Figure 1 is a plan view of a button to which my improvement has been applied. Fig. 2 is a sectional elevation of the same, taken through the line x x, Fig. 1.

The object of this invention is to facilitate and cheapen the ornamentation of buttons and other articles of jewelry.

The invention consists in coating the surface of the article to be ornamented with borax and water or other flux, applying a layer of suitable solder-filings, a layer of filings of gold or other metal, and another layer of solder-filings, and heating the article sufficiently to melt the solder and fasten the gold-filings in place, as will be hereinafter fully described.

In carrying my invention into practical effect, the surface to be ornamented is coated with borax and water or other suitable flux, a little mucilage being added, if desired, and is then covered with suitable solder-filings and heated sufficiently to evaporate the water and cause the solder to adhere to the surface. The solder-filings are then coated with borax and water or other suitable flux, and covered with suitable metal filings by bringing the said surface in contact with a heap of metal filings, by sprinkling the metal filings over the surface, or by applying the gold or other metal filings with a wet brush, and a layer of solder-filings is sprinkled over the metal filings. The article thus prepared is then heated sufficiently with a blow-pipe flame to melt the solder and cause it to flow through all the interstices between the particles of the metal filings, and thus solder the said metal particles securely in place, producing an appearance similar to heavy hammer-chasing, but superior in richness of finish.

This method of ornamentation can be applied to stock so light that it could not be subjected to hammer-chasing without having its shape injured and being thus rendered useless.

If desired, and especially when the layer of metal filings is required to be thin, the inner layer of solder-filings can be omitted, the solder from the outside layer flowing through the interstices of the metal filings sufficiently to secure the metal particles in place.

Having thus described my invention, I claim as new and desire to secure by Letters Patent—

1. The method of ornamenting the surface of jewelry and other articles, substantially as herein shown and described, which consists in coating the article to be ornamented with borax and water or other suitable flux, applying a layer of gold or other metal filings and one or more layers of solder-filings, and heating the article sufficiently to melt the solder and fasten the metal filings in place, as set forth.

2. As an improved article of manufacture, jewelry made substantially as herein shown and described, having its surface coated with metal filings soldered to said surface, as set forth.

WILLIS H. HOWES.

Witnesses:
LEWIS J. MULFORD,
FRED L. SMITH.